US009262493B1

(12) United States Patent
Dietrich

(10) Patent No.: US 9,262,493 B1
(45) Date of Patent: Feb. 16, 2016

(54) DATA ANALYTICS LIFECYCLE PROCESSES

(71) Applicant: David Dietrich, Hopedale, MA (US)

(72) Inventor: David Dietrich, Hopedale, MA (US)

(73) Assignee: EMC Corporation, Hopkinton, MA (US)

( * ) Notice: Subject to any disclaimer, the term of this patent is extended or adjusted under 35 U.S.C. 154(b) by 241 days.

(21) Appl. No.: 13/728,394

(22) Filed: Dec. 27, 2012

(51) Int. Cl.
*G06F 17/30* (2006.01)

(52) U.S. Cl.
CPC .............................. *G06F 17/30563* (2013.01)

(58) Field of Classification Search
USPC .................. 707/608, 609, 687, 705, 790, 821
See application file for complete search history.

(56) References Cited

U.S. PATENT DOCUMENTS

| 8,548,954 | B2 | 10/2013 | Cina | |
|---|---|---|---|---|
| 8,700,678 | B1 | 4/2014 | Fan | |
| 9,098,617 | B1 | 8/2015 | Pauley, Jr. | |
| 9,098,803 | B1 | 8/2015 | Todd et al. | |
| 2002/0198889 | A1* | 12/2002 | Vishnubhotla | 707/101 |
| 2004/0128287 | A1 | 7/2004 | Keller et al. | |
| 2008/0294583 | A1 | 11/2008 | Hunt et al. | |
| 2010/0017870 | A1 | 1/2010 | Kargupta | |
| 2010/0088284 | A1 | 4/2010 | Cina | |
| 2011/0066589 | A1 | 3/2011 | Chang et al. | |
| 2011/0145392 | A1 | 6/2011 | Dawson et al. | |
| 2011/0251874 | A1 | 10/2011 | Banthia et al. | |
| 2012/0054182 | A1 | 3/2012 | Gupta et al. | |
| 2012/0089980 | A1 | 4/2012 | Sharp et al. | |
| 2012/0131591 | A1 | 5/2012 | Moorthi et al. | |
| 2012/0158633 | A1* | 6/2012 | Eder | 706/46 |
| 2012/0185851 | A1 | 7/2012 | Zhang et al. | |
| 2012/0215582 | A1 | 8/2012 | Petri et al. | |
| 2012/0233315 | A1 | 9/2012 | Hoffman et al. | |
| 2012/0271949 | A1 | 10/2012 | Radhakrishnan et al. | |
| 2012/0330869 | A1* | 12/2012 | Durham | 706/16 |
| 2013/0091170 | A1 | 4/2013 | Zhang et al. | |
| 2013/0139152 | A1* | 5/2013 | Chang et al. | 718/1 |
| 2013/0173569 | A1 | 7/2013 | Pearcy | |
| 2013/0326538 | A1 | 12/2013 | Gupta et al. | |
| 2014/0115610 | A1 | 4/2014 | Marinelli et al. | |
| 2014/0330744 | A1 | 11/2014 | Hampapur et al. | |
| 2014/0330745 | A1 | 11/2014 | Hampapur et al. | |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.
U.S. Appl. No. 13/628,589, filed in the name of W.A. Pauley, Jr. et al. on Sep. 27, 2012 and entitled "Data Analytics Lifecycle Automation."

(Continued)

*Primary Examiner* — Sana Al Hashemi
(74) *Attorney, Agent, or Firm* — Ryan, Mason & Lewis, LLP

(57) ABSTRACT

A data analytic plan is defined for analyzing a given data set associated with a given data problem. A test data set and a training data set are obtained from the given data set associated with the given data problem. At least one model is executed to confirm an adequacy of the at least one model for the data analytic plan by fitting the at least one model on the training data set and evaluating the at least one model fitted on the training data set against the test data set. The defining, obtaining and executing steps are performed on one or more processing elements associated with a computing system and automate at least part of a data analytics lifecycle.

18 Claims, 7 Drawing Sheets

(56) References Cited

OTHER PUBLICATIONS

P.K. Gunda, et al., "Nectar: Automatic Management of Data and Computation in Datacenters," Proceedings of the 9th Symposium on Operating Systems Design and Implementation (OSDI), Oct. 2010, 14 pages.

H. Herodotou et al., "MapReduce Programming and Cost-Based Optimization? Crossing this Chasm with Starfish," Proceedings of the VLDB Endowment, 2011, 4 pages, vol. 4, No. 12.

H. Herodotou et al., "Starfish: a Self-Tuning System for Big Data Analytics," 5th Biennial Conference on Innovative Data Systems Research (CIRD '11), Jan. 2011, pp. 261-272.

G. Lee et al., "Heterogeneity-Aware Resource Allocation and Scheduling in the Cloud," Proceedings of the USENIX Conference on Hot Topics in Cloud Computing, 2011, pp. 1-5.

T. Nykiel et al., "MRShare: Sharing Across Multiple Queries in MapReduce," Proceedings of the VLDB Endowment, 2010, pp. 494-505, vol. 3, No. 1.

P. Russom et al., "Big Data Analytics," TDWI Best Practices Report, 2011, 38 Pages, The Data Warehousing Institute.

R.G. Sargent, "Verification and Validation of Simulation Models," Proceedings of the 2005 Winter Simulation Conference, 2005, pp. 130-143.

I.H. Witten et al., "Data Mining: Practical Machine Learning Tools and Techniques," 2011, 664 pages, 3d ed., Morgan Kaufmann Publishers, United States.

K. Zhang et al., "Sedic: Privacy-Aware Data Intensive Computing on Hybrid Clouds," Proceedings of the 18th ACM Conference on Computer and Communications Security (CCS '11), 2011, pp. 515-525.

U.S. Appl. No. 13/728,394, filed in the name of David Dietrich on Dec. 27, 2012 and entitled "Data Analytics Lifecycle Processes."

L. Proctor et al., "Analytical Pathway Methodology: Simplifying Business Intelligence Consulting," 2011 Annual SRII Global Conference, IEEE 2011, pp. 495-500.

S. Amjad et al., "Automating Scholarly Article Data Collection with Action Science Explorer," 2014 International Conference on Open Source Systems and Technologies (ICOSST), 2014 IEEE, pp. 160-169.

G. Alatorre et al., "Intelligent Information Lifecycle Management in Virtualized Storage Environments," 2014 SRII Global Conference, 2014 IEEE, pp. 9-18.

G. Cai et al., "Semantic Data Fusion Through Visually-enabled Analytical Reasoning," 2014 17th International Conference, 2014 IEEE, pp. 1-7.

\* cited by examiner

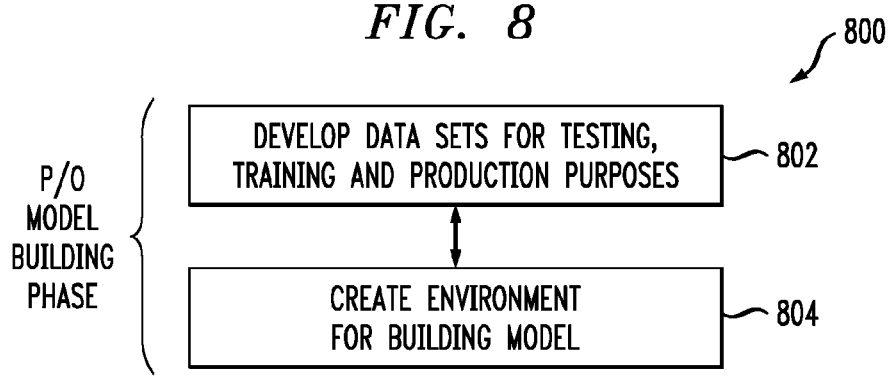
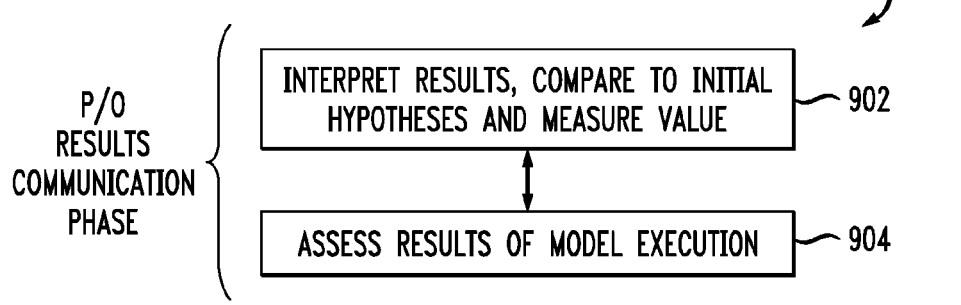
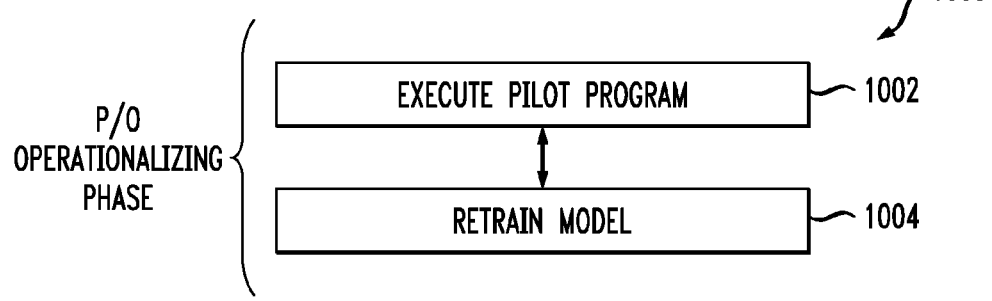

DATA ANALYTICS LIFECYCLE PROCESSES

FIELD

The field relates to data analytics, and more particularly to techniques for automating a data analytics lifecycle and provisioning a computing system in accordance with the automated data analytics lifecycle.

BACKGROUND

Data analytics typically refers to the science that incorporates various disciplines including, but not limited to, data engineering, mathematics, statistics, computing, and domain-specific expertise. A data scientist thus is one who practices some or all aspects of data analytics in attempting to solve complex data problems.

Conventional data analytics solutions are becoming more and more limited due to the increasing sizes and varying structures of data sets that such solutions are applied against. Such limitations include the lack of ability to adequately estimate the cost of the data analytics solution, and the inflexibility of the solution once it is defined. These negative factors result in a computing system provisioned to implement the data analytics solution that is costly and that does not adequately handle the data it was intended to handle.

Accordingly, improved data analytics techniques are needed that enable business users and data scientists to execute data analytics more easily and efficiently.

SUMMARY

Embodiments of the invention provide techniques for automating a data analytics lifecycle and provisioning a computing system in accordance with the automated data analytics lifecycle.

In one embodiment, a method comprises the following steps. A data analytic plan is defined for analyzing a given data set associated with a given data problem. A test data set and a training data set are obtained from the given data set associated with the given data problem. At least one model is executed to confirm an adequacy of the at least one model for the data analytic plan by fitting the at least one model on the training data set and evaluating the at least one model fitted on the training data set against the test data set. The defining, obtaining and executing steps are performed on one or more processing elements associated with a computing system and automate at least part of a data analytics lifecycle.

Further, the method may comprise deploying the data analytic plan in a controlled subset of the environment in which the plan could otherwise be fully deployed, retraining the at least one model after deploying the data analytic plan in the controlled subset of the environment, and re-executing the at least one model after the retraining step.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, embodiments described herein provide techniques for data analytics solutions that reduce cost uncertainty, and that are flexible in terms of changing solution parameters and growing data sets.

These and other features and advantages of the present invention will become more readily apparent from the accompanying drawings and the following detailed description.

BRIEF DESCRIPTION OF THE DRAWINGS

FIG. 8 illustrates details of a model building phase of a data analytics lifecycle, in accordance with one embodiment of the invention.

FIG. 9 illustrates details of a results communication phase of a data analytics lifecycle, in accordance with one embodiment of the invention.

FIG. 10 illustrates details of an operationalizing phase of a data analytics lifecycle, in accordance with one embodiment of the invention.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the term "provisioning" refers to the process(es) of generating and deploying one or more computing resources in a computing system, such as for example, in a cloud infrastructure environment, generating and deploying one or more virtual machines in a data center.

FIGS. 1A through 4 will be used to describe an exemplary data analytics lifecycle automation and provisioning system in which various data analytics methodologies described in the context of FIGS. 5 through 10 may be employed. Further details of this exemplary system can be found in the U.S. patent application identified as Ser. No. 13/628,589, filed on Sep. 27, 2012, and entitled "Data Analytics Lifecycle Automation," the disclosure of which is incorporated by reference herein in its entirety. However, it is to be understood that the methodologies of FIGS. 5 through 10 can be employed in data analytics systems other than the ones described in FIGS. 1A through 4.

Figure 1A:
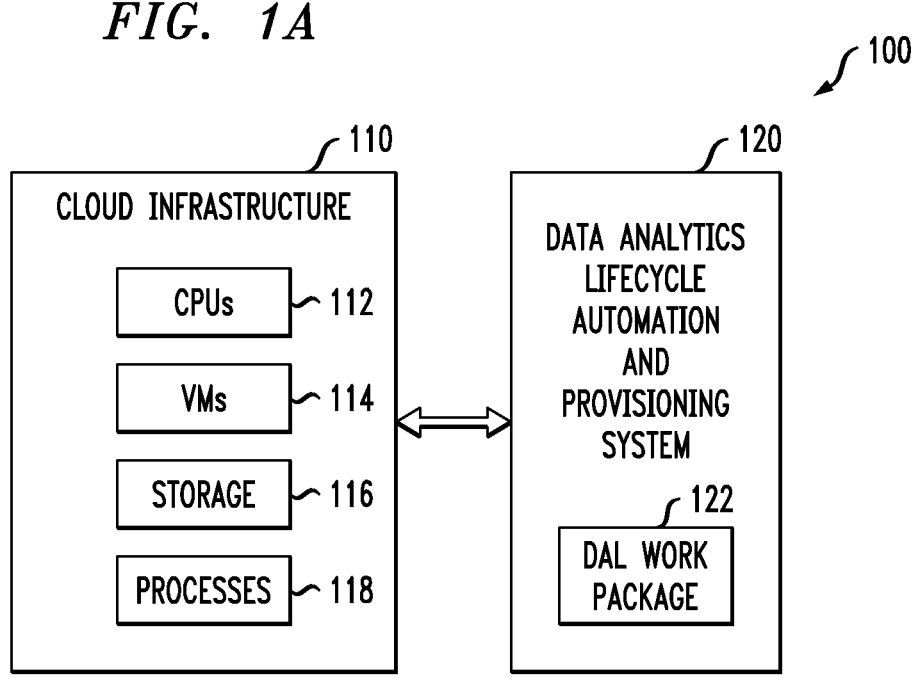
FIG. 1A illustrates cloud infrastructure and a data analytics lifecycle automation and provisioning system, in accordance with one embodiment of the invention.

FIG. 1A shows a system 100 configured in accordance with an illustrative embodiment of the present invention. The system 100 comprises cloud infrastructure 110 and a data analytics lifecycle automation and provisioning system 120.

As will be explained in detail below, the data analytics lifecycle automation and provisioning system 120 enables a data scientist to automatically, yet still interactively, create a work package 122 that can be executed to solve one or more complex data problems. By "work package" it is meant a specific executable plan (e.g., a data analytic plan) for solving the one or more complex data problems. System 120 accomplishes this, as will be explained in detail below, by providing processing elements that embody phases of a data analytics lifecycle (DAL) including, but not limited to, discovery, data preparation, model planning, model building, and operationalization of results.

Cloud infrastructure 110 is illustratively depicted in the figure as comprising an execution environment with execution components comprising one or more central processing units (CPUs) 112, one or more VMs 114, and storage devices 116 (upon which logical units (LUNs) are implemented) that execute one or more processes 118 that operate on one or more process input data sets that generate one or more process output data sets. Thus, the work package generated by system 120 can be operationalized using execution components (both physical and virtual computing resources) in the cloud infrastructure 110.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the data analytics lifecycle automation and provisioning 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
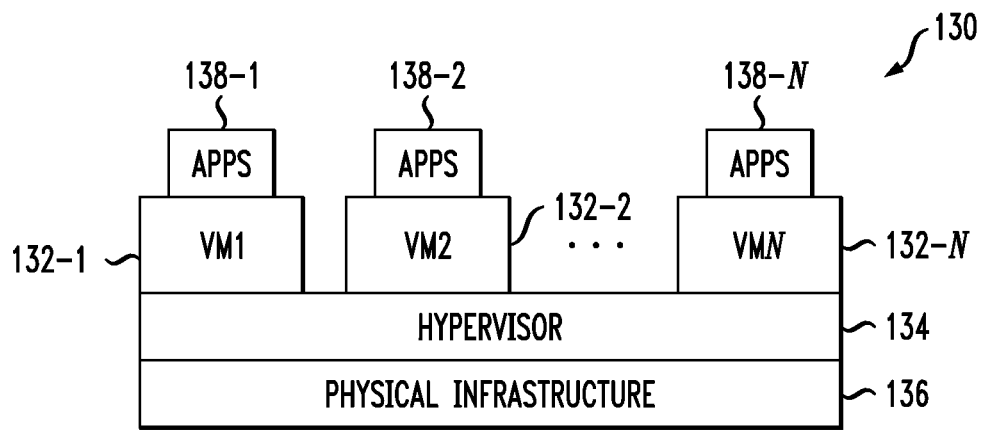
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, ... 132-N implemented using a hypervisor 134. The hypervisor 134 is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, ... 138-N running on respective ones of the virtual machines 132-1, 132-2, ... 132-N (utilizing associated LUNs or virtual disks) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

An example of a commercially available hypervisor platform that may be used to implement portions of the cloud infrastructure 130 (110) in one or more embodiments of the invention is the VMware® vSphere™ which may have an associated virtual infrastructure management system such as the VMware® VCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
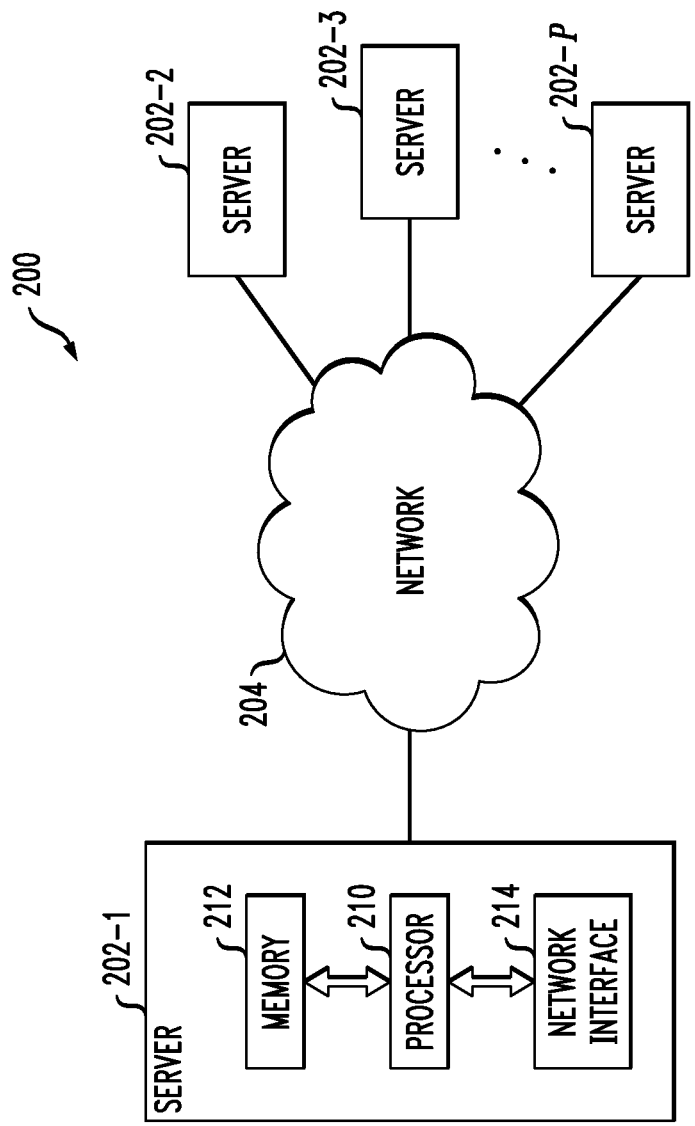
FIG. 2 illustrates a processing platform on which the cloud infrastructure and the data analytics lifecycle automation and provisioning system of FIG. 1A are implemented, in accordance with one or more embodiments of the invention.

An example of a processing platform on which the cloud infrastructure 110 and/or the data analytics lifecycle automation and provisioning 120 of FIG. 1A may be implemented is processing platform 200 shown in FIG. 2. The processing platform 200 in this embodiment comprises at least a portion of the system 100 and includes a plurality of servers, denoted 202-1, 202-2, 202-3, ... 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the data analytics lifecycle automation and provisioning system 120 will now be described with reference to FIGS. 3 and 4 with further details of data analytics methodologies to be described with reference to FIGS. 5 through 10.

It is to be understood that the spectrum of complex data problem types that the data analytics lifecycle automation and provisioning system can be used to address is far reaching. By way of example only, the data scientist is typically faced with the task of designing a data processing system that handles data associated with tasks such as, for example, a complex research project, a data mining project involving a very large amount of data in one or more different structures (so-called "big data"), one or more applications that a customer entity wishes to be hosted by a service provider entity (e.g., in a data center environment), a business problem, etc. The common problem that the data scientist faces with each of these complex data problem types is how to design and provision the computing environment (platform) that will be used for analysis and what data sets to include in the analysis. Part of the problem is also identifying the size and compute power needed for the analytic "sandbox," as will be described below, in which the data scientist will work and experiment with the data.

Figure 3:
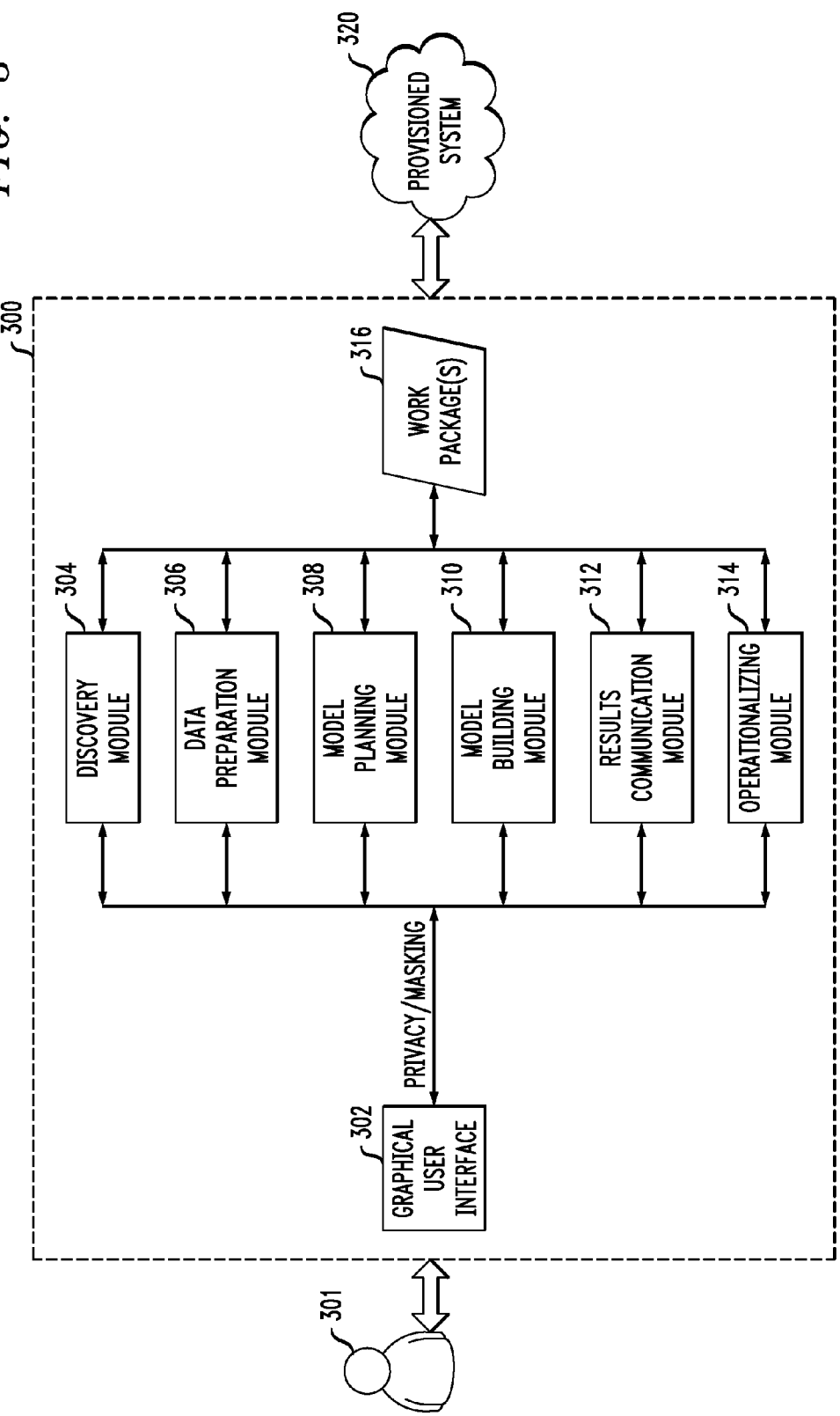
FIG. 3 illustrates a data analytics lifecycle automation and provisioning system, in accordance with one embodiment of the invention.
Figure 4:
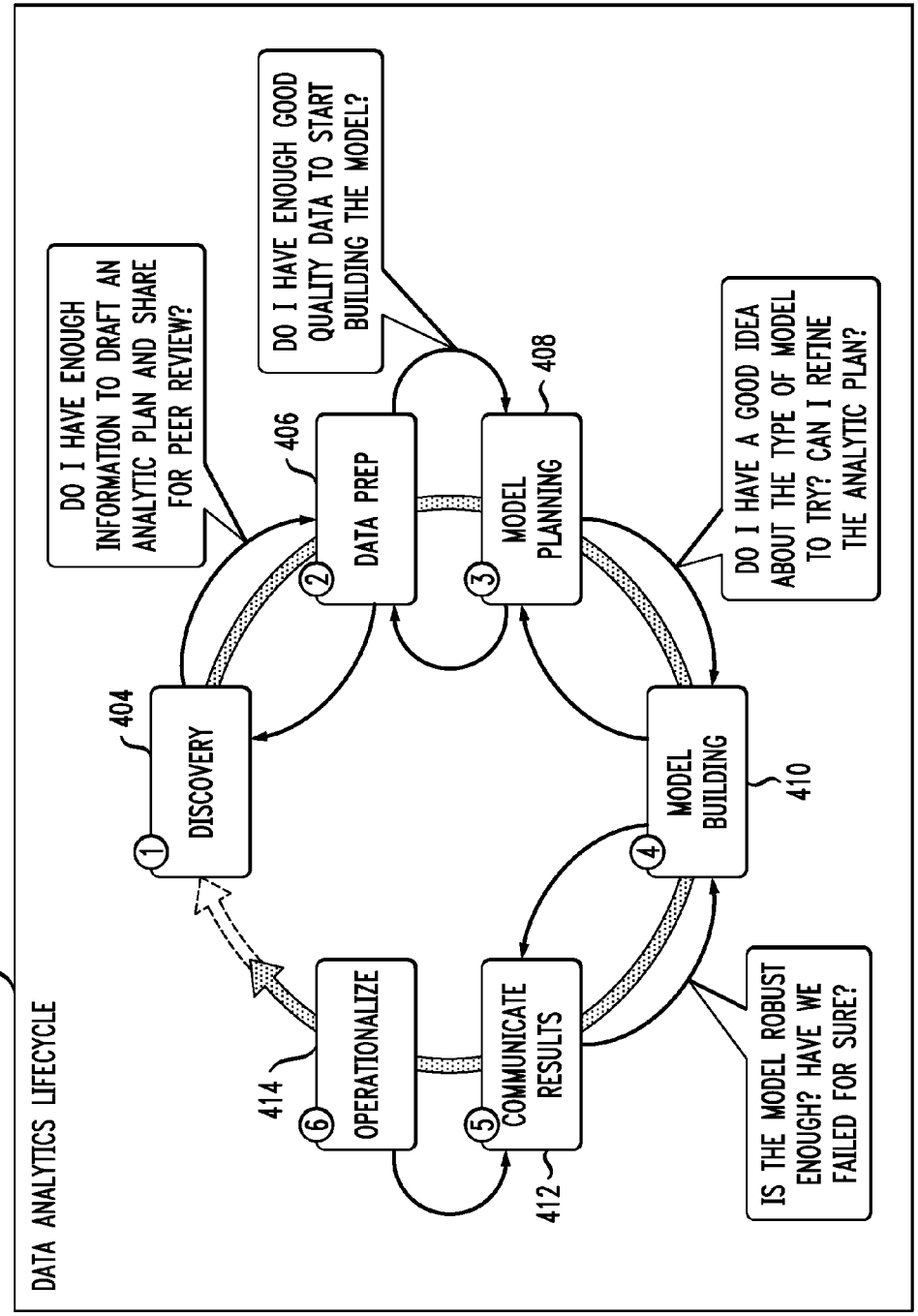
FIG. 4 illustrates a data analytics lifecycle automation and provisioning methodology, in accordance with one embodiment of the invention.

FIG. 3 illustrates a system for assisting the data scientist, inter alia, to overcome the problems mentioned above. More particularly, FIG. 3 depicts a data analytics lifecycle automation and provisioning system 300 (e.g., corresponding to system 120 of FIG. 1) that allows a data scientist 301 (or some other user or users, e.g., business user) to design and generate a provisioned system 320 that can be used to analyze and otherwise process data associated with a given complex data problem.

As shown, system 300 includes a graphical user interface 302, a discovery module 304, a data preparation module 306, a model planning module 308, a model building module 310, a results communication module 312, an operationalizing module 314, and one or more work packages 316. Note that the components of system 300 in FIG. 3 may be implemented on a single computing system, or one or more components of system 300 may be implemented in a distributed computing system, e.g., across multiple servers 202 in FIG. 2.

The graphical user interface (GUI) 302 is the interface(s) through which the data scientist 301 interacts (e.g., enters data, responses, queries to one or more modules, and receives data, results, and other output generated by one or more modules) with system 300. It is to be understood that the interface used to interact with system 300 does not necessarily have to be a graphical user interface, but rather could be through command lines or some other form of input/output. As such, embodiments of the invention are not limited to any particular form of user interface.

Note that the six modules of the system 300 respectively correspond to the phases of a data analytics lifecycle (DAL). FIG. 4 depicts the six phases of a DAL 402, according to one embodiment of the invention, including: a discovery phase 404, a data preparation phase 406, a model planning phase 408, a model building phase 410, a results communication phase 412, and an operationalizing phase 414. Each component of the system 300 assists the data scientist 301 in generating work package 316 that is used to provision the actual analytics system (provisioned system 320) that addresses the given complex data problem.

A description of each DAL phase will now be given with an exemplary problem for which the system 320 is being designed and provisioned. In this example, the problem is a business problem. More specifically, and by way of example only, the business problem is assumed to be the task of accelerating innovation in a global technology corporation. Three aspects of this problem may be: (a) the tracking of knowledge growth throughout the global employee base of the corporation; (b) ensuring that this knowledge is effectively transferred within the corporation; and (c) effectively converting this knowledge into corporate assets. Developing an analytics system (320 in FIG. 3) that executes on these three aspects more effectively should accelerate innovation, which will thus improve the viability of the corporation. Thus, the task of system 300 is to develop such an analytics system. Of course, it is to be understood that this corporate innovation acceleration problem is just one of a myriad of examples of complex data problems that system 300 using DAL 402 can be used to address.

Discovery Phase 404 (Performed by Module 304 in System 300).

In the discovery phase, the data scientist develops an initial analytic plan. The analytic plan lays the foundation for all of the work in the analytic project being developed to address the business problem. That is, the analytic plan assists the data scientist 301 in identifying the business problem, a set of hypotheses, the data set, and a preliminary plan for the creation of algorithms that can prove or disprove the hypotheses. By way of example only, in the corporate innovation acceleration problem mentioned above, one hypothesis identified by the user as part of the analytic plan may be that an increase in geographic knowledge transfer in a global corporation improves the speed of idea delivery. This hypothesis paves the way for what data will be needed and what type of analytic methods will likely need to be used.

Figure 5:
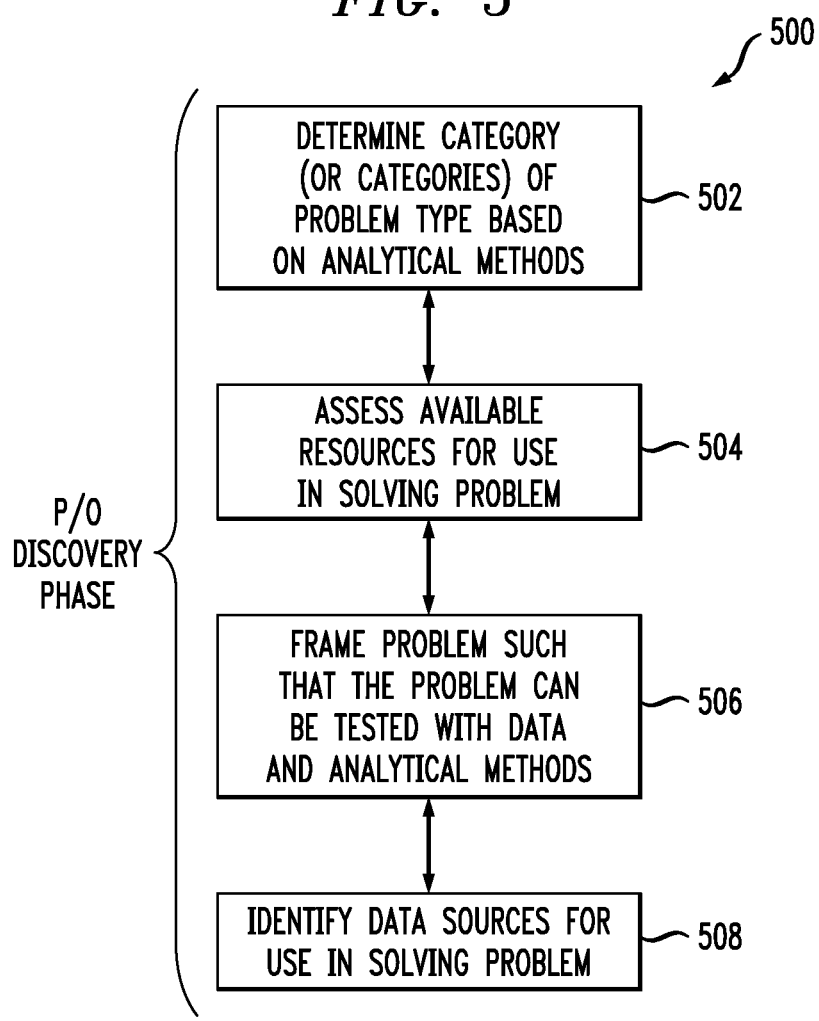
FIG. 5 illustrates details of a discovery phase of a data analytics lifecycle, in accordance with one embodiment of the invention.

FIG. 5 illustrates details of the discovery phase of a data analytics lifecycle 400. It is to be appreciated that while FIG. 5 shows details of the discovery phase as methodology 500, one or more of the steps shown therein can be performed alone and in any order (i.e., different than that shown in the figure). Also, two or more steps may be combined.

As shown in step 502, the discovery module 304 in system 300 (FIG. 3) assists the data scientist or business user to determine the category (or categories) of the general problem type based on groups of analytical methods such as, but not limited to, clustering, classification, text mining and/or predictive models.

In step 504, the discovery module 304 assists the data scientist or business user to assess the available resources such as, but not limited to, people, processes, technologies, data sources, systems, and time.

Step 506 shows framing of the data analytics problem. It is realized that one of the biggest challenges in data analytics is framing the problem (e.g., business problem) into an approach that can be tested with data and analytics.

In step 508, the discovery module 304 assists the data scientist or business user to identify data sources for use in solving the problem. This allows the data scientist or business user to aggregate sources for previewing the data and provide high-level understanding, review the raw data, determine the structures and tools needed, and scope the kind of data needed for this kind of problem.

For example, at this phase, one may consider the volume, type, structure, velocity of change and time span of the data needed to test one or more hypotheses. Also the data scientist or business user should keep in mind the data sources needed, and ensure to get access to more than simply aggregated data. In most cases, it is beneficial to utilize raw data (non-conditioned) in order to run it through the models in a subsequent phase. A thorough diagnosis of the data situation will inform the kinds of tools and techniques to use in the subsequent phases. In addition, performing data exploration in this phase helps determine the amount of data needed, in terms of the amount of historical data to obtain, the structure and format. That is, the system helps the data scientist or business user develop an idea based on the scope of the data and allows him/her to validate the idea with one or more domain experts on a given project.

Data Preparation Phase 406 (Performed by Module 306 in System 300).

As the arrows in DAL 402 indicate, the six phases are iterative and interrelated/interconnected, and as such, one phase can be returned to from one of the other phases in the process. Also, proceeding to the second phase (406) is often a matter of whether or not the data scientist is ready and comfortable sharing the analytic plan developed in the first phase (404) with his/her peers (this comfort level is reflective of the maturity of the analytic plan—if it is too rough and unformed, it will not be ready to be shared for peer review). If so, then the data preparation phase 406 can begin. That is, once the analytic plan has been delivered and socialized, the next step focuses on the data. In particular, the next step is about conditioning the data. The data must be in an acceptable shape, structure, and quality to enable the subsequent analysis.

Continuing with the corporate innovation acceleration example, assume that the type of data that the analytics project relies on falls into two categories: (i) an "idea submission" data set (essentially a large-scale database containing structured data); and (ii) a globally-distributed set of unstructured documents representing knowledge expansion within the corporation in the form of minutes and notes about innovation/research activities. It is realized that these data sets cannot be analyzed in their raw formats. In addition, it is possible that the data is not of sufficient quality. Furthermore, the data likely contains inconsistencies.

All of these issues suggest that a separate analytic "sandbox" must be created to run experiments on the data. The "sandbox" here refers to a separate analytics environment used to condition and experiment with the data. This sandbox is realized via data preparation module 306. On average the size of this sandbox should be roughly ten times the size of the data in question. As such, the sandbox preferably has: (i) large bandwidth and sufficient network connections; (ii) a sufficient amount of data including, but not limited to, summary data, raw data that may be structured or unstructured, raw data feeds and connections, call logs, web logs, etc.; and (iii) transformations needed to assess data quality and derive statistically useful measures. Regarding transformations, it is preferred that module 306 transform the data after it is obtained, i.e., ELT (Extract, Load, Transform), as opposed to ETL (Extract, Transform, Load). However, the transformation paradigm can also be expressed as ETLT (Extract, Transform, Load, Transform again), in order to attempt to encapsulate both approaches of ELT and ETL. In either the ELT or ETLT case, this allows analysts to choose to transform the data (to obtain conditioned data) or use the data in its raw form (the original data), without losing the granular details that may be lost if they are working only with summarized data. Examples of transformation tools that can be available as part of data preparation module 306 include, but are not limited to, Hadoop™ (Apache Software Foundation) for analysis, Alpine Miner™ (Alpine Data Labs) for creating analytic workflows, and R transformations for many general purpose data transformations. Of course, a variety of other tools may be part of module 306.

Figure 6:
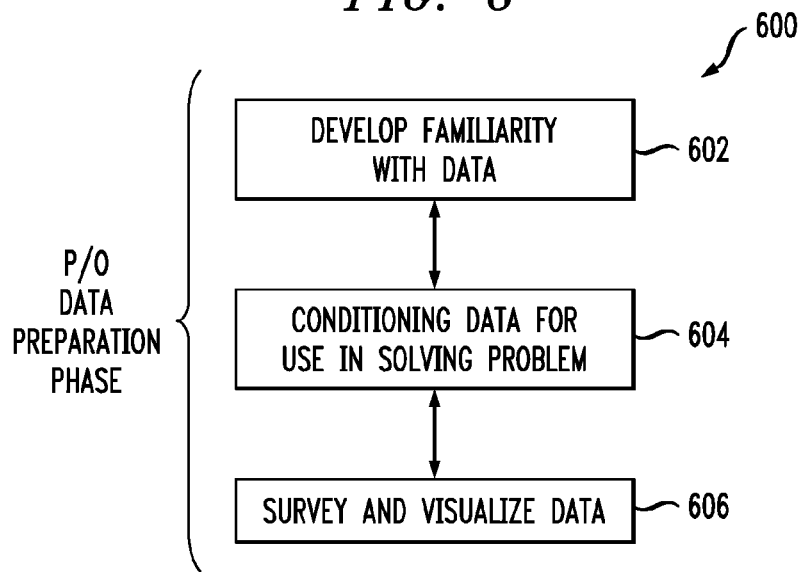
FIG. 6 illustrates details of a data preparation phase of a data analytics lifecycle, in accordance with one embodiment of the invention.

It is further realized that once the sandbox is created, there are activities that allow a data scientist to assess whether or not the data set(s) he/she is using will be suitable to meet the goals outlined in the data analytic plan. These activities are depicted in methodology 600. Again, it is to be appreciated that while FIG. 6 shows details of the data preparation phase as methodology 600, one or more of the steps shown therein can be performed alone and in any order (i.e., different than that shown in the figure). Also, two or more steps may be combined.

(i) Step 602: Familiarization with the data. The data scientist 301 lists out all the data sources and determines whether key data is available or more information is needed. This can be done by referring back to the analytic plan developed in phase 404 to determine if one has what is needed, or if more data must be loaded into the sandbox.

(ii) Step 604: Perform data conditioning. Clean and normalize the data. During this process, the data scientist 301 also discerns what to keep versus what to discard. Discarding too much or filtering out too much information can cause many problems when it comes time to analyze data. While it can be beneficial to normalize data, if data is normalized too much or too early in the process, it can restrict the data available to analyze in subsequent phases. An example of this is an analysis for fraud detection on credit card usage. Many times, the outliers in this data population can represent higher-risk transactions that may be indicative of fraudulent credit card activity. Often, data analysts and database administrators may inadvertently filter out these outliers or transform and clean them before being loading the records into a database. For this reason, ELT or ETLT, as described above, is encouraged so that you have data in its raw state and also the ability to transform it after loading as well. This approach provides clean data to analyze after it is in the database and the data in its original form for finding hidden nuances in the data.

(iii) Step 606: Survey and visualize the data. The data scientist 301 can create overviews, zoom and filter, get details, and begin to create descriptive statistics and evaluate data quality. Taking an overview of the data may include using data visualization methods or diagnostic tools such as descriptive statistics to learn about the quality and distribution of the dataset. Step 606 can also run descriptive statistics and assess data quality.

It is realized that one should review data to ensure that calculations remain consistent within columns or across tables for a given data field. For instance, questions should be considered such as, but not limited to, whether customer lifetime value changed at some point in the middle of data collection, or if a financial interest rate calculation change from simple to compound at the end of the year. In addition, the data scientist will examine the distribution of the data and evaluate if this remains consistent over all the data, and if not, what can be done to accommodate complex data distributions. At this phase, one should assess the granularity of the data, the range of values, and level of aggregation of the data. For instance, for marketing data, if you are interested in targeting customers of "having a family" age, does your training data represent that, or is it full of seniors and teenagers? Examine whether the units of measure for a given variable are consistent and will enable one to complete the desired analysis, as outlined in the analytic plan. For instance, for time-related variables, are the measurements daily, weekly, monthly? Is time measured in seconds everywhere, or is it in milliseconds some places? Determine if the data is standardized/normalized, whether the scales are consistent, and how normal or irregular the data is? For geospatial data sets, determine whether state abbreviations are consistent across the data. These are some typical considerations that should be part of the thought process as the data scientist or business user assesses the data with which the system will work. Becoming knowledgeable about the data will be critical when it comes time to construct and run models later in the process.

Model Planning Phase 408 (Performed by Module 308 in System 300).

Model planning represents the conversion of the business problem into a data definition and a potential analytic approach. A model contains the initial ideas on how to frame the business problem as an analytic challenge that can be solved quantitatively. There is a strong link between the hypotheses made in phase 404 (discovery phase) and the analytic techniques that will eventually be chosen. Model selection (part of the planning phase) can require iteration and overlap with phase 406 (data preparation). Multiple types of models may be applicable to the same business problem. Selection of methods can also vary depending on the experience of the data scientist. In other cases, model selection is more strongly dictated by the problem set.

Described below are a few exemplary algorithms and approaches (but not an exhaustive list) that may be considered by the data scientist 301 in the exemplary accelerated corporate innovation hypothesis given above:

(i) Use Map/Reduce for extracting knowledge from unstructured documents. At the highest level, Map/Reduce imposes a structure on unstructured information by transforming the content into a series of key/value pairs. Map/Reduce can also be used to establish relationships between innovators/researchers discussing the knowledge.

(ii) Natural language processing (NLP) can extract "features" from documents, such as strategic research themes, and can store them into vectors.

(iii) After vectorization, several other techniques could be used:
  (a) Clustering (e.g., k-means clustering) can find clusters within the data (e.g., create 'k' types of themes from a set of documents).
  (b) Classification can be used to place documents into different categories (e.g., university visits, idea submission, internal design meeting).
  (c) Regression analysis can focus on the relationship between an outcome and its input variables, and answers the question of what happens when an independent variable changes. Regression analysis can help in predicting outcomes. This could suggest where to apply resources for a given set of ideas.
  (d) Graph theory (e.g., social network analysis) is a way to establish relationships between employees who are submitting ideas and/or collaborating on research.

At this point in the DAL 402, the data scientist 301 has generated some hypotheses, described potential data sets, and chosen some potential models for proving or disproving the hypotheses.

Figure 7:
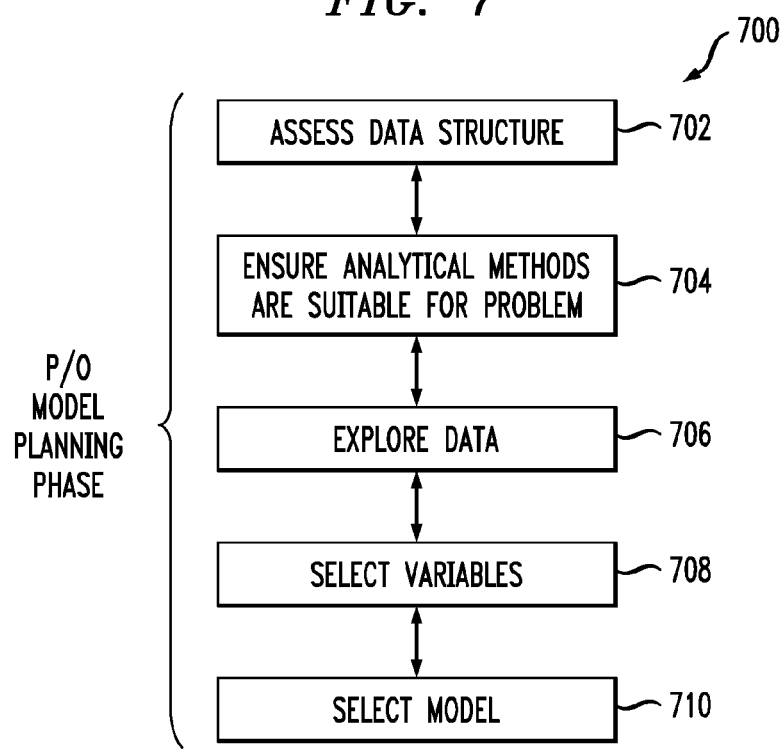
FIG. 7 illustrates details of a model planning phase of a data analytics lifecycle, in accordance with one embodiment of the invention.

FIG. 7 illustrates details of the model planning phase of a data analytics lifecycle 400. It is to be appreciated that while FIG. 7 shows details of the model planning phase as methodology 700, one or more of the steps shown therein can be performed alone and in any order (i.e., different than that shown in the figure). Also, two or more steps may be combined.

Step 702: Assessing the structure of the data is one of the key shifts in the way data scientists or business users should approach analytics. This consideration is driven heavily by the concept of "big data," which is providing new data in new structures (e.g., images, surveillance video, text messages, sensors, GPS-enabled smart phones, etc.) and therefore evaluating the structure of data is becoming increasingly important. The structure of the data is one factor that will dictate the tools and analytical techniques one can use in the next phase. Depending on whether one is analyzing textual data or transactional data will dictate different tools and approaches (e.g., sentiment analysis) as compared with forecasting market demand based on structured financial data (e.g., revenue projections and market sizing using regressions).

Step 704: Ensure that the analytical techniques enable the data scientist or business user to meet the business objectives and prove or disprove the working hypotheses. At this step, one can determine if the situation warrants a single test (e.g., Binomial Logistic Regression or Market Basket Analysis) or a series of techniques as part of a larger analytic workflow.

Step 706: Data exploration. There is some exploration in the data preparation phase, mostly for data hygiene reasons and to assess the quality of the data itself. In this phase, it is important to explore the data to understand the relationships among the variables to inform selection of the variables and methods, and to understand the problem domain. Using tools to help with data visualizations can help with this, and aid in previewing the data and assessing relationships between variables.

Step 708: Variable Selection. In this step, inputs are gathered from stakeholders and domain experts, the essence of predictors is captured, and a technique for dimensionality reduction is leveraged. Iterative testing may be used to confirm the most significant variables.

Step 710: Model Selection. Converting the model created in an in-memory application (such as R, Octave, etc.) or a native statistical package to SQL enables the system to run the operation in-database, which provides optimal performance during runtime. Here, one can consider the major data mining and predictive analytical techniques, such as categorization, association rules, and regressions. One can determine if the system is using techniques that are best suited for structured data, unstructured data, or a hybrid approach. As mentioned above, MapReduce can be leveraged to analyze unstructured data.

Model Building Phase 410 (Performed by Module 310 in System 300).

In the model building phase, the system experimentally runs the one or more models that the data scientist 301 selected in phase 408. The model(s) may be executed on a portion of the original (raw) data, a portion of the conditioned data (transformed in phase 406), or some combination thereof. In this phase, the initial data analytic plan is updated to form a refined data analytic plan.

For example, Map/Reduce algorithm, NLP, clustering, classification, regression analysis and/or graph theory models are executed by module 310 on a test sample of the data identified and conditioned by module 306 in phase 406 (data preparation). Here the data scientist 301 is able to determine whether the models he/she selected are robust enough (which depends on the specific domain of the data problem being addressed) and whether he/she should return to the model planning phase 408. For example, in the corporate innovation acceleration example, some portion of the data sets identified in the earlier phases (e.g., structured idea submissions and unstructured support documents) is processed with the selected models.

FIG. 8 illustrates details of the model building phase of a data analytics lifecycle 400. It is to be appreciated that while FIG. 8 shows details of the model building phase as methodology 800, one or more of the steps shown therein can be performed alone and in any order (i.e., different than that shown in the figure). Also, two or more steps may be combined.

In step 802, the data scientist or business user develops data sets for testing, training, and production purposes. The data scientist or business user needs to ensure that the model data is sufficiently robust for the model and analytical techniques, i.e., use smaller, test sets for validating approach, and a training set for initial experiments.

In this phase, the model is fit on the training data and evaluated (scored) against the test data. Generally, this work takes place in the sandbox, not in the live production environment. The phases of model planning and model building overlap quite a bit, and in practice one can iterate back and forth between the two phases for a while before settling on a final model. Some methods require the use of a training data set, depending on whether it is a supervised or unsupervised algorithm for machine learning. Although the modeling techniques and logic required to build this step can be highly complex, the actual duration of this phase can be quite short, compared with all of the preparation required on the data and defining the approaches.

As part of this phase, the following steps are conducted:

(1) Execute the one or more models defined in the model planning phase.

(2) Where possible, convert the models to SQL (structured query language) or similar appropriate database language and execute as in-database functions, since the runtime will be significantly faster and more efficient than running in memory. Execute R models on large data sets as PL/R or SQL (PL/R is a PostgreSQL language extension that allows one to write PostgreSQL functions and aggregate functions in R).

(3) Use, for example, R (or Octave) models on file extracts for testing and small data sets.

(4) Assess the validity of the model and its results (for instance, confirm it accounts for most of the data, and has robust predictive power).

(5) Fine tune the models to optimize the results (for example, modify variable inputs).

(6) Record the results, and logic of the model.

While doing these iterations and refinement of the model, consider the following:

Does the model look valid and accurate on the test data?
Does the model output/behavior make sense to the domain experts? That is, does it look like the model is giving "the right answers," or answers that make sense in this context?
Is the model accurate enough to meet the goal?
Is it avoiding the kind of mistakes it needs to avoid? Depending on context, false positives may be more serious or less serious than false negatives, for instance.
Do the parameter values of the fitted model make sense in the context of the domain?
Do you need more data or more inputs? Do you need to transform or eliminate any of the inputs?
Do you need a different form of model? If so, the user will need to go back to the model planning phase and revise the modeling approach.

In step 804, the best environment is created (either as a staging environment or within an analytical sandbox) for building models and workflows including, but not limited to, fast hardware, parallel processing, etc.

Results Communication Phase 412 (Performed by Module 312 in System 300).

In the results communication phase, the results of the model execution of phase 410 are reported to the data scientist 301 (via GUI 302). This phase is also where the analytic plan that was initially developed in phase 404 and fine-tuned through phases 406, 408 and 410 can be output by the system 300 (i.e., as a refined or final analytic plan). The final analytic plan at this point in the DAL 402 may be referred to as a work package (316 in FIG. 3).

FIG. 9 illustrates details of the results communication phase of a data analytics lifecycle 400. It is to be appreciated that while FIG. 9 shows details of the results communication phase as methodology 900, one or more of the steps shown therein can be performed alone and in any order (i.e., different than that shown in the figure). Also, two or more steps may be combined.

In step 902, the data scientist or business user interprets the results, compares to the initial hypotheses, and quantifies (and measures) the business value. For example, the results can be integrated into work processes or the implications of the model output can be measured in terms of dollar value, time saved, or uncertainty reduced when making important decisions.

In step 904, the data scientist or business user assesses the results of the models, determines what was observed in the data as a result of the analytics, and as a result of this phase, documents the key findings and major insights.

Thus, this phase of the lifecycle deals with the idea that, now that the system has executed the model, the system needs to go back and compare the outcomes to criteria for success and failure. For example, a data scientist or business user has to consider how best to articulate the findings and outcome to the various team members and stakeholders. He/she should make sure to consider and include caveats, assumptions, and any limitations of results. Because a presentation may be circulated within an organization, one should be thoughtful of how to convey the findings and clearly articulate the outcomes. One should make recommendations for future work or improvements to existing processes, and consider what each of the team members and stakeholders needs in order to fulfill their responsibilities.

Consider the following example within an organization. Sponsors have to champion their project, stakeholders have to understand how the model affects their processes (for instance, if its a churn model, marketing has to understand how to use the churn model predictions in planning their interventions), and production engineers need to operationalize the work that has been done. In addition, this is the phase where one can underscore the business benefits of the work, and begin making the case to eventually put the logic into a live production environment.

Accordingly, now that model has been executed, one can do the following:

(1) Assess the results of the models:
  i. Are the results statistically significant and valid? If so, which aspects of the results stand out? If not, what adjustments need to be made to refine and iterate on the model to make it valid?
  ii. Which data points are surprising, and which were in line with your incoming hypotheses that you developed in the first phase? It is realized that comparing the actual results to the ideas formulated early on typically produces additional ideas and insights that would have been missed if one did not take time to formulate initial hypotheses early in the process.
(2) What is observed in the data as a result of the analytics?
  i. Of these, what are the most significant findings?
  ii. What is the business value and significance of these findings? Depending on what emerged as a result of the model, one may need to spend time quantifying the business impact of the results to help prepare for the presentation.

As a result of this phase, the data scientist or business user, in conjunction with the results communication module 312 of system 300, will have documented the key findings and major insights as a result of the analysis. The deliverable as a result of this phase will be the most visible portion of the process to the outside stakeholders and sponsors, so one should take care to clearly articulate the results, methodology, and business value of your findings.

Operationalizing Phase 414 (Performed by Module 414 in System 300).

Operationalizing refers to the process of actually provisioning computing resources (physical and/or virtualized) to generate the system that will be deployed to handle the analytics project in accordance with the final analytic plan, e.g., system 320 in FIG. 3. This may involve provisioning VMs and LUNs as well as other virtual and physical assets that are part of cloud infrastructure 110 in FIG. 1. The provisioned system will then analyze subsequent data that is obtained for the given complex data problem.

FIG. 10 illustrates details of the operationalizing phase of a data analytics lifecycle 400. It is to be appreciated that while FIG. 10 shows details of the operationalizing phase as methodology 1000, one or more of the steps shown therein can be performed alone and in any order (i.e., different than that shown in the figure). Also, two or more steps may be combined.

In step 1002, a pilot program is executed. A pilot program typically serves as a test of a suitable analytical project prior to executing the model in a full-scale, live production environment. In step 1004, the model can be retrained as necessary or desired. For instance, this step is where users tune and recalibrate the model over time. This kind of tuning can be done in an automated way, or with human intervention.

More specifically, the pilot program is set up so one can deploy the work in a controlled way before broadening the work to a full enterprise or ecosystem of users. In the model building phase, the system scored the model in the sandbox, and now in the operationalizing phase, this is the first time that most analytics approach deploy the new analytical methods or models in a production environment. Rather than deploying this on a wide scale basis, it is recommended that one do a small scope, pilot deployment first. Taking this approach will allow one to limit the amount of risk relative to a full, enterprise deployment and learn about the performance and related constraints on a small scale and make fine tune adjustments before a full deployment.

As one considers this effort, consider running the model in a product environment for a discrete set of single products, or a single line of business, which will test the model in a live setting. This will allow one to learn from the deployment, and make any needed adjustments before launching across the enterprise. Keep in mind that this phase can bring in a new set of team members—namely those engineers who are responsible for the production environment, who have a new set of issues and concerns. They want to ensure that running the model fits smoothly into the production environment and the model can be integrated into downstream processes. While executing the model in the production environment, look to detect anomalies on inputs before they are fed to the model. Assess run times and gauge competition for resources with other processes in the production environment. After deploying the model, conduct follow up reviews to reevaluate the model after it has been in production for a period of time. Assess whether the model is meeting goals and expectations, and if desired changes (such as increase in revenue, reduction in churn) are actually occurring. If these outcomes are not occurring, determine if this is due to a model inaccuracy, or if its predictions are not being acted on appropriately. If needed or desired, automate the retraining/updating of the model. In any case, ongoing monitoring of model accuracy will be needed, and if accuracy degrades, the model will need to be retrained. If feasible, one should design alerts for when the model is operating "out-of-bounds." This includes situations when the inputs are far beyond the range that the model was trained on, which will cause the outputs of the model to be inaccurate. If this begins to happen regularly, retraining is called for.

Many times analytical projects yield new insights about a business, a problem, or an idea that people may have taken at face value or thought was impossible to dig into. If appropriate, hold a meeting with the analytic team to discuss what about the process or project one would change if the project were to be done again from the beginning.

Given the detailed description of the data analytics lifecycle phases above, we now make some observations and introduce some other features and advantages of the system.

Assume that the data scientist 301 is at a later phase in the process but then realizes that he/she forgot to include some data in the discovery phase 404 that is needed to complete the analysis. Advantageously, the interrelated and iterative nature of DAL 402 and the flexibility of the system used to automate the DAL (system 300) provide the data scientist with the ability to return to the discovery phase, correct the error, and return to a subsequent stage with the results for each stage affected by the change being automatically updated.

During the model building phase 410, it is not known what resources are going to be needed, which have a specific cost, and definition of what would be included (amount of storage, number of VMs, the analytics tools needed, etc.). Being able to know the approximate cost and configuration needed would be very useful for the process of tuning the model based on cost or configuration constraints. Thus, during each phase of the DAL 402, the data scientist 301 is presented (at GUI 301) with an inventory of the current infrastructure, services, and tools needed and their approximate cost as changes are made to the parameters associated with the analysis. This allows the data scientist to remove or change the model dynamically based on resource constraints (e.g., cost or VM limits).

Once the analytics work package 316 is defined, provisioning the resources needed to most efficiently support the analysis is important. As such, embodiments of the invention automate and execute work packages for the data scientist by constructing the work package and providing resource and cost estimates throughout the DAL.

Many times, introducing new raw, source data sets into a project can have cascading effects on the size of the analytic sandbox (see data preparation phase 406 above) needed to support the analysis. Embodiments of the invention provide selectable sizing multiples to dynamically provision the system parameters, such as a storage capacity, bandwidth required, and compute power depending on the type of new data involved and its size. For example, these sizing multiples could be used between phases 404 and 406, between 406 and 408, and even between phase 408 and 410. The sizing multiples serve as a mechanism for dynamically provisioning and adjusting the size, capacity, and constraints needed for the analytic sandbox.

By way of example only, assume there is 100 GB worth of innovation data that is to be analyzed. The data preparation module 306 multiplies this value by some constant (e.g., 10 or 20 times) in order to estimate the capacity of the analytic sandbox. That is, the data scientist will take the 100 GB of data and run transformations and other experiments that will require additional amounts of capacity. Therefore, the data preparation module 306 creates a work package specification that states: "allocate 1 TB of sandbox data which has the following features . . . . " This aspect of the work package instructs cloud provisioning software to allocate appropriately.

It is also realized that privacy of data is a major concern when mining large amounts or correlating various types of data. Privacy of the individuals needs to be protected while still allowing useful analysis and presentation of the data. Embodiments of the invention provide for masking capabilities in the work package 316, as well as any data presented by the system, for the data scientist, as well as creating contextual views based on the identity of the consumer of the output. This feature is very useful, particularly in a highly regulated data environment.

Further, the privacy/masking techniques associated with the work package 316 and other data can be employed to protect the data from wholesale viewing by the data scientist or an output generated by the work package execution. Also it is possible to create multiple views of the data based on privacy constraints tied to the context and role of the potential viewer. For example, a mid-level sales manager may have the ability to see consolidated data across the sales areas in the country, but his/her subordinates within the same area would only be allowed to see that specific area's data view as they are not authorized to see data across the country for regulatory (e.g., Security and Exchange Commission) reasons.

As a consequence of the privacy aspect, the data scientist can receive a diagnostic summary stating the resources they have access to for the analytical work they are planning to pursue.

While some illustrative privacy/masking techniques have been described above, it is to be understood that alternative privacy protection controls (such as, but not limited to, privacy anonymization) can be employed in system 300.

In addition, the operationalizing module 314 can make predictions of the types of additional technology resources and tools needed to complete the analytics, based on the type of analytics being undertaken. As a result, the data scientist would be notified early if they needed to request additional tools that would enable them to complete their work. This aspect of system 300 enables the data scientist to initiate funding requests earlier in the DAL, identify people if specific skill sets are needed (such as a Hadoop™ expert in addition to a mathematician), and operationalize the resources before the data modeling stages (e.g., identify this during phase 404 of the DAL, rather than in phase 410) to avoid bottlenecks in the project.

It is further realized that a work package containing a larger sized data set will contribute to an increased cost, as provisioning will increase. Besides size, other data set characteristics may impact cost, e.g., perhaps publicly available data is cheaper than sensitive data, which requires an anonymization service. System 300 gives the data scientist insight into which data set characteristics would be most beneficial to the analytic plan.

Further, it is realized that the work of all data scientists is not equal. For example, a critical project such as one directed by an officer of the company (e.g., CEO) could require higher priority and take precedence over existing work packages. Also, perhaps the CEO's work package should be executed faster than regular data scientists, thus increasing provisioning. System 300 accounts for the priority levels associated with the data scientists.

Advantageously, system 300 allows a data scientist to know ahead of execution time the execution costs. Additionally, the system is able to dynamically change system parameters as the data scientist begins to refine the data and the analysis without having to start all over again or manually de-provision or increase the provisioned resources. System 300 creates a dynamic work package that includes the parameters needed to move through the analytics lifecycle and include the automation necessary to allow the data scientist to focus on fine tuning the parameters and not on manually changing the infrastructure or data ingest process.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising:
defining a data analytic plan for analyzing a given data set associated with a given data problem associated with a data analytics lifecycle;
obtaining a test data set and a training data set from the given data set associated with the given data problem;
executing at least one model to confirm an adequacy of the at least one model for the data analytic plan by fitting the at least one model on the training data set and evaluating the at least one model fitted on the training data set against the test data set, wherein the evaluation comprises assessing a validity of the at least one model and a validity of results of the execution of the at least one model on the test data set;
refining the at least one model based on the assessment;
conditioning at least a portion of raw data in the given data set to generate conditioned data;
creating an analytics environment in which the executing, evaluating and conditioning steps are performed, the analytics environment comprising parameters including at least a capacity and a bandwidth of the analytics environment; and dynamically changing the parameters in response to the refining step to include parameters to perform additional executing and evaluating steps on refinements of the at least one model;

wherein the step of dynamically changing the parameters is performed such that the data analytics lifecycle is configured to continue from a point in the lifecycle where the parameters were changed;

wherein the execution of the at least one model is performed prior to implementation of the data analytic plan in a destination environment;

wherein the training data set is used to train the at least one model and the test data set is used to determine the accuracy of the at least one model fitted on the training data set; and wherein the defining, obtaining, executing, refining, conditioning, creating and dynamically changing steps are performed on one or more processing elements associated with a computing system and automate at least part of the data analytics lifecycle.

2. An apparatus comprising:

a memory; and at least one processor operatively coupled to the memory and configured to:

define a data analytic plan for analyzing a given data set associated with a given data problem associated with a data analytics lifecycle;

obtain a test data set and a training data set from the given data set associated with the given data problem;

execute the at least one model to confirm an adequacy of the at least one model for the data analytic plan by fitting the at least one model on the training data set and evaluate the at least one model fitted on the training data set against the test data set, wherein the evaluation comprises assessing a validity of the at least one model and a validity of results of the execution of the at least one model on the test data set;

refine the at least one model based on the assessment;

condition at least a portion of raw data in the given data set to generate conditioned data;

create an analytics environment in which the executing, evaluating and conditioning operations are performed, the analytics environment comprising parameters including at least a capacity and a bandwidth of the analytics environment; and dynamically change the parameters in response to the refining operation to include parameters to perform additional executing and evaluating operations on refinements of the at least one model;

wherein the operation of dynamically changing the parameters is performed such that the data analytics lifecycle is configured to continue from a point in the lifecycle where the parameters were changed;

wherein the execution of the at least one model is performed prior to implementation of the data analytic plan in a destination environment;

wherein the training data set is used to train the at least one model and the test data set is used to determine the accuracy of the at least one model fitted on the training data set; and wherein the defining, obtaining, executing, refining, conditioning, creating and dynamically changing operations automate at least part of the data analytics lifecycle.

3. A system comprising:

a discovery phase module for defining a data analytic plan for analyzing a given data set associated with a given data problem associated with a data analytics lifecycle;

a model building phase module for obtaining a test data set and a training data set from the given data set associated with the given data problem, executing the at least one model to confirm an adequacy of the at least one model for the data analytic plan by fitting the at least one model on the training data set and evaluating the at least one model fitted on the training data set against the test data set, wherein the evaluation comprises assessing a validity of the at least one model and a validity of results of the execution of the at least one model on the test data set, refining the at least one model based on the assessment; and a data preparation phase module for conditioning at least a portion of raw data in the given data set to generate conditioned data, and for creating an analytics environment in which the executing, evaluating and conditioning operations are performed, the analytics environment comprising parameters including at least a capacity and a bandwidth of the analytics environment;

wherein the parameters are dynamically changed in response to the refining operation to include parameters to perform additional executing and evaluating operations on refinements of the at least one model;

wherein the operation of dynamically changing the parameters is performed such that the data analytics lifecycle is configured to continue from a point in the lifecycle where the parameters were changed;

wherein the execution of the at least one model is performed prior to implementation of the data analytic plan in a destination environment;

wherein the training data set is used to train the at least one model and the test data set is used to determine the accuracy of the at least one model fitted on the training data set; and wherein the discovery phase module, the model building phase module, and the data preparation phase module are implemented on one or more processing elements associated with a computing system so as to automate at least part of the data analytics lifecycle.

4. The method of claim 1, wherein the model execution step further comprises converting the model to a database language prior to execution.

5. The method of claim 1, wherein the step of refining the at least one model further comprises modifying one or more model variables.

6. The method of claim 1, wherein the test data set is smaller than the training data set.

7. The method of claim 1, wherein the data analytic plan definition step further comprises determining at least one category of problem type based on one or more analytical methods.

8. The method of claim 1, wherein the data analytic plan definition step further comprises assessing available resources based on the data analytic plan.

9. The method of claim 1, wherein the data analytic plan definition step further comprises identifying data sources based on the data analytic plan.

10. The method of claim 1, wherein the raw data conditioning step further comprises performing an extract, load and transform process on the portion of the raw data.

11. The method of claim 1, wherein the raw data conditioning step further comprises performing an extract, transform, load and transform process on the portion of the raw data.

12. The method of claim 1, further comprising interpreting one or more results of the model execution step by comparing the one or more results to the data analytic plan.

13. The method of claim 1, further comprising interpreting one or more results of the model execution step by measuring a business value of the one or more results.

14. The method of claim 1, further comprising deploying the data analytic plan in a controlled subset of the destination environment in which the data analytic plan could otherwise be fully deployed.

15. A computer program product comprising a processor-readable storage medium having encoded therein executable code of one or more software programs, wherein the one or more software programs when executed by the one or more processing elements of the computing system implement the steps of the method of claim 1.

16. The method of claim 4, wherein the model execution step further comprises executing the database language-converted model as one or more functions within the database.

17. The method of claim 14, further comprising retraining the at least one model after deploying the data analytic plan in the controlled subset of the destination environment.

18. The method of claim 17, further comprising re-executing the at least one model after the retraining step.

* * * * *